(12) United States Patent
Nilsson et al.

(10) Patent No.: US 12,296,798 B2
(45) Date of Patent: May 13, 2025

(54) ELECTROMECHANICAL BRAKING SYSTEM

(71) Applicant: Haldex Brake Products Aktiebolag, Landskrona (SE)

(72) Inventors: Anders Nilsson, Shanghai (CN); Anders Lindqvist, Shanghai (CN)

(73) Assignee: Haldex Brake Products Aktiebolag, Landskrona (SE)

( * ) Notice: Subject to any disclaimer, the term of this patent is extended or adjusted under 35 U.S.C. 154(b) by 301 days.

(21) Appl. No.: 17/842,857

(22) Filed: Jun. 17, 2022

(65) Prior Publication Data

US 2022/0314950 A1 Oct. 6, 2022

Related U.S. Application Data

(63) Continuation of application No. PCT/EP2020/085257, filed on Dec. 9, 2020.

(30) Foreign Application Priority Data

Dec. 21, 2019 (CN) .......................... 201911331551.5

(51) Int. Cl.
*B60T 13/74* (2006.01)
(52) U.S. Cl.
CPC ....... *B60T 13/741* (2013.01); *B60T 2270/413* (2013.01); *B60T 2270/414* (2013.01)
(58) Field of Classification Search
CPC ............. B60T 13/741; B60T 2270/413; B60T 2270/414
USPC .................................................. 303/3, 15, 20
See application file for complete search history.

(56) References Cited

U.S. PATENT DOCUMENTS

| | | | |
|---|---|---|---|
| 11,046,330 B1* | 6/2021 | Katzourakis | B60W 10/20 |
| 11,951,963 B2* | 4/2024 | Hwang | B60T 7/12 |
| 2004/0026158 A1 | 2/2004 | Rieth | |
| 2018/0328430 A1* | 11/2018 | Feigel | B60T 13/746 |
| 2019/0299944 A1* | 10/2019 | Nilsson | B60T 7/042 |
| 2021/0323523 A1* | 10/2021 | Adler | B60T 13/662 |

(Continued)

FOREIGN PATENT DOCUMENTS

| | | |
|---|---|---|
| DE | 101 14 600 A1 | 1/2002 |
| DE | 10 2006 032 279 A1 | 1/2008 |

(Continued)

OTHER PUBLICATIONS

International Search Report for PCT/EP2020/085257 dated Mar. 2, 2021.

*Primary Examiner* — Christopher P Schwartz
(74) *Attorney, Agent, or Firm* — Price Heneveld LLP (57) ABSTRACT

The present invention relates to a braking technology of a vehicle, and in particular to an electromechanical brake (EMB) system with redundant power supply. The electromechanical brake system comprises a recharging power source (21) and at least two control modules (221, 222) corresponding to axles (241, 242) of a vehicle. The control modules (221, 222) comprise a power supply unit (251, 252) that supplies power to electric brake devices (231, 232, 233, 234) disposed at opposite ends of a corresponding axle (241, 242) in response to an operation demand. The power supply unit (251, 252) is charged by the recharging power source (21). The power supply unit (21) of at least one of the control modules (221, 222) is configured with redundancy.

11 Claims, 5 Drawing Sheets

(56) References Cited

U.S. PATENT DOCUMENTS

2022/0194344 A1* 6/2022 Tarandek .................. B60T 8/17
2022/0340114 A1* 10/2022 Marx ...................... B60T 17/22

FOREIGN PATENT DOCUMENTS

| EP | 1 997 703 A2 | 12/2008 |
| EP | 2 570 314 A1 | 3/2013 |
| EP | 3 339 119 A1 | 6/2018 |
| GB | 2 331 338 A | 5/1999 |
| WO | 2001/062569 A1 | 8/2001 |

* cited by examiner

ELECTROMECHANICAL BRAKING SYSTEM

CROSS REFERENCE TO RELATED APPLICATIONS

This application is a continuation of International Application PCT/EP20201085257 with an international filing date of Dec. 9, 2020 and claiming priority to co-pending Chinese Patent Application No. ON 201911331551.5 entitled "An electromechanical brake system", filed on Dec. 21, 2019.

FIELD OF THE INVENTION

The present invention relates to a braking technology of a vehicle, and in particular to an electromechanical brake (EMB) system with redundant power supply.

BACKGROUND OF THE INVENTION

An electromechanical brake (EMB) system is an environment-friendly vehicle brake system with simple structure and fast response, which is one of the future development directions of braking technology.

Figure 1:
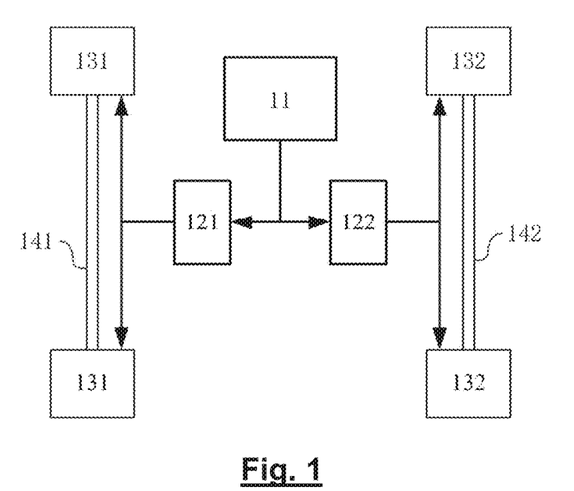
FIG. 1 shows a schematic diagram of a conventional electromechanical brake system.

Referring to FIG. 1, FIG. 1 shows a schematic diagram of a conventional electromechanical brake system. As shown in FIG. 1, different from traditional brake system that uses gas or liquid as energy transfer medium, the braking energy of the electromechanical brake system comes from a battery 11 or a generator of a vehicle, whose energy is charged to two ultra-capacitor modules 121-122 after voltage conversion. The two ultra-capacitor modules 121-122 may respectively output sufficient energy to corresponding electric brake devices 131-132 in a short time to generate braking force.

Specifically, the electric brake devices 131-132 of the electromechanical brake system may comprise a brake motor powered by the ultra-capacitor modules 121-122 to generate a braking force, and a mechanical transmission mechanism driven by the brake motor. In a disc brake, the mechanical transmission mechanism finally generates a braking force by driving a caliper to clamp the brake disc. When a driver presses a brake pedal or a braking demand is generated by a non-human operation (e.g. ABS, ESC, AEBS, automatic driving system, etc.), the electric brake device 131-132 may control the brake motor to rotate, thereby driving the mechanical transmission mechanism to push brake pads towards or away from brake discs in response to the braking demand.

However, when the load of a vehicle with the above-mentioned conventional electromechanical brake system is unbalanced, for example, when the axle 141 bears the main in load of the vehicle, the electric brake device 131 may not be able to obtain sufficient energy to generate braking force if the ultra-capacitor module 121 fails and cannot supply power to the corresponding electric brake device 131. The vehicle can only be braked by the electric brake devices 132 corresponding to the axle 142 that bears a smaller load. At this time, since the friction force generated by the wheels at both ends of the axle 142 is limited only by the load of the axle 142, the braking performance of the vehicle may be seriously affected.

Therefore, in order to overcome the shortcomings in the prior art, there is an urgent need in the art for a vehicle braking technology that improves redundancy of power supply network of a brake system, and solves the problem of braking capacity reduction of a vehicle that is caused by the failure of some parts of the power supply network, thereby improving the reliability of the electromechanical brake system.

Further prior art is known from EP 3 339 119 A1, EP 1 997 703 A2, EP 2 570 314 A1 and DE 101 14 600 A1 corresponding to patent family member US 200410026158 A1.

SUMMARY OF THE INVENTION

A brief overview of one or more aspects is provided below to provide a basic understanding of these aspects. The summary is not an extensive overview of all of the aspects that are contemplated, and is not intended to identify key or decisive elements in all aspects. The sole purpose of the summary is to present some concepts of one or more aspects in a simplified form as a prelude to the more detailed description that is presented later.

The electromechanical brake system preferably comprises a recharging power source and at least two control modules corresponding to axles of a vehicle. Each control module comprises a power supply unit that supplies power to electric brake devices disposed at opposite ends of a corresponding axle in response to an operation demand. The power supply unit is charged by the recharging power source. The power supply unit of at least one of the control modules is configured with redundancy. By configuring the power supply unit as a redundant power supply structure, redundant power supply may be provided to the corresponding electric brake device, thereby maintaining the braking performance of the vehicle when part of the power supply network fails.

One possible object of the present invention is
- to overcome the shortcomings of the prior art and/or
- to provide an electromechanical brake system with redundant power supply, which improves redundancy of power supply network of the brake system and/or
- to solve the problem of braking capacity reduction of a vehicle that is caused by the failure of some parts of the power supply network, thereby improving the reliability of the electromechanical brake system.

According to one proposal in the electromechanical brake system the power supply unit with redundancy may comprise at least two sub-power supply units. The two sub-power supply units may redundantly supply power to the corresponding electric brake devices, so that when one of the sub-power supply units fails, power may still be supplied to the corresponding electric brake device to maintain the braking performance of the vehicle.

According to the electromechanical brake system provided, preferably each of the sub-power supply units electrically connects the electric brake devices disposed at both ends of the corresponding axle, wherein said two sub-power supply units redundantly supply power to each electric brake device disposed at each end of the corresponding axle; or each of the sub-power supply units may simultaneously supply power to the electric brake devices disposed at both ends of the corresponding axle.

According to the electromechanical brake system provided in the present invention, optionally, the electric brake device may comprise a brake motor comprising at least two sets of windings and/or drive modules, wherein each of the sub-power supply units may supply power to one set of the windings and/or the drive modules. With the above configuration, the electric brake device may have a redundant driving circuit.

According to the electromechanical brake system provided in the present invention, optionally, the electric brake device may comprise an electromagnetically operated braking force holding device comprising at least two sets of windings and/or drive modules, wherein each of the sub-power supply units may supply power to one set of the windings and/or the drive modules, With the above configuration, the braking force holding device may have a redundant driving circuit.

According to the electromechanical brake system provided in the present invention, preferably, the braking force holding device may comprise an electromagnetic brake and/or a solenoid.

According to the electromechanical brake system provided in the present invention, optionally, each sub-power supply unit electrically connects the electric brake device disposed at one end of the corresponding axle and supplies power thereto.

According to the electromechanical brake system provided in the present invention, optionally, the control module may further comprise an energy management unit corresponding to the power supply unit, wherein the energy management unit may be configured to manage charging and discharging of the corresponding power supply unit. The electromechanical brake system may control the recharging power source to charge each power supply unit and/or control each power supply unit to supply power to a corresponding electric brake device according to current energy level of each power supply unit by the energy management unit.

According to the electromechanical brake system provided in the present invention, preferably, the energy management unit may comprise a charge controller, electrically connected to the recharging power source and the corresponding power supply unit, wherein the charge controller may control the recharging power source to charge the corresponding in power supply unit depending on an energy level of the corresponding power supply unit. The energy level comprises, but is not limited to, a voltage value of the power supply unit.

According to the electromechanical brake system provided in the present invention, optionally, the energy management unit may comprise a power supply switch, electrically connected to a corresponding electric brake device and the corresponding power supply unit, wherein the power supply switch may control the corresponding power supply unit to supply power to the corresponding electric brake device in response to the operation demand.

According to the electromechanical brake system provided in the present invention, optionally, the power supply unit of the control module corresponding to the axle loaded with body weight of the vehicle may be configured as the redundant power supply unit. By configuring the power supply unit of the axle that carries the weight of the vehicle body as a redundant power supply unit, the axle corresponding to the redundant power supply unit always carries at least the main body weight regardless of whether the vehicle is unloaded or the load is uneven, so as to ensure that the wheels at both ends may always generate a certain amount of friction, thereby ensuring the braking performance of the electric brake device through redundant power supply when part of the power supply network fails.

According to the electromechanical brake system provided in the present invention, optionally, the power supply unit may comprise a capacitive power source and/or a battery.

According to the electromechanical brake system provided in the present invention, optionally, a plurality of the control modules may be electrically connected to each other, wherein the power supply units of the plurality of the control modules may be redundant with each other. By adopting the structure of a plurality of electrically connected control modules, when a power failure occurs in one of the control modules, the electromechanical brake system may supply power to the faulty control module or supply power directly to the electric brake device corresponding to the faulty control module via the internal circuit of the faulty control module by using the power supply unit of another normally working control module as a backup power source, thereby ensuring that the electric brake device corresponding to the faulty control module may still generate braking force.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least", For example, if an element is mentioned, this is to be understood such that there is exactly one element or there are two elements or more elements. Additional features may be added to these features, or these features may be in the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

After reading the detailed description of the embodiments of the present disclosure in conjunction with the following drawings, the above features and advantages of the present invention can be better understood. In the drawings, various components are not necessarily drawn to scale, and components with similar related characteristics or features may have the same or similar reference numerals.

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

The embodiments of the present invention are described in the following detailed description. Other advantages and effects of the present invention will be readily apparent to those skilled in the art from this disclosure. Although the description of the present invention will be described in conjunction with the preferred embodiments, this is not a limitation of the present invention. On the contrary, the invention is described in connection with the embodiments so as to cover other alternatives or modifications that are possible in the embodiments of the present invention. In order to provide a thorough understanding of the present invention, many specific details are included in the following description. The present invention may also be practiced without these details. In addition, some specific details are omitted in the description in order to avoid confusing or obscuring the present invention.

In the description of the present invention, it should be noted that the terms "installation", "connecting", and "connected" should be understood broadly unless explicitly stated and defined otherwise. For example, the terms "installation", "connecting", and "connected" may be either a fixed connection, a detachable connection, or an integral connection; the terms may be either a mechanical connection or an electrical connection; the terms also may be either a direct connection, an indirect connection through an intermediate medium, or an internal connection between two components. The specific meaning of the above terms in the present invention can in be understood in a specific case by those skilled in the art.

In order to overcome the shortcomings of the prior art, the present invention provides an electromechanical brake (EMB) system with redundant power supply, which improves redundancy of power supply network of the brake system, and solves the problem of braking capacity reduction of a vehicle that is caused by the failure of some parts of the power supply network, thereby improving the reliability of the electromechanical brake system.

Figure 2:
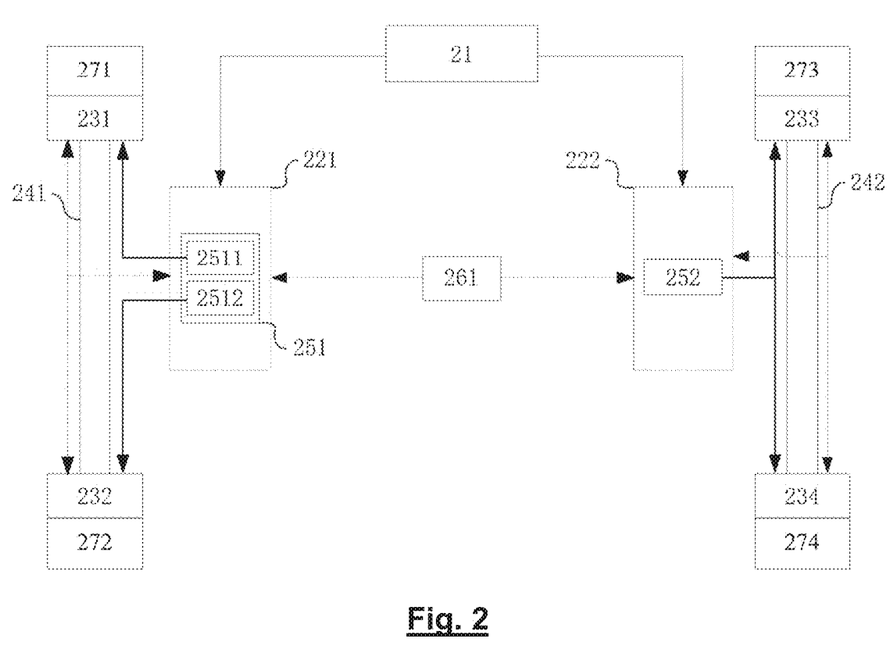
FIG. 2 shows a schematic structural diagram of an electromechanical brake system according to an aspect of the present invention.

Referring to FIG. 2. FIG. 2 shows a schematic structural diagram of an electromechanical brake system according to an aspect of the present invention.

As shown in FIG. 2, the vehicle may comprise two axles 241-242. Each axle 241-242 may be provided with a wheel 271-274 at each of the two ends. Each wheel 271-274 may be configured with a corresponding electric brake device 231-234. The electric brake devices 231-234 may comprise a brake motor for generating a braking force, and a mechanical transmission mechanism driven by the brake motor. The electric brake devices 231-234 may be configured to perform corresponding operations according to a received operation demand.

Accordingly, the electromechanical brake system provided according to this embodiment may comprise a recharging power source 21 and two control modules 221-222 corresponding to the axles 241-242. The control module 221 may comprise a power supply unit 251 that supplies power to the electric brake devices 231-232 provided at both ends of the corresponding axle 241 in response to the operation demand. The control module 222 may comprise a power supply unit 252 that supplies power to the electric brake devices 233-234 provided at both ends of the corresponding axle 242 in response to the operation demand. The power supply units 251-252 comprise, but are not limited to, a capacitive power source and a battery, and are charged by the recharging power source 21. The recharging power source 21 comprises, but is not limited to, a vehicle battery, a power battery, a vehicle generator, and a hub generator. The output voltage of the recharging power source 21 may be 12 V or 24 V. Taking the control module 221 as an example, in an exemplary implementation, the control module 221 comprising the power supply unit 251 may be installed on the vehicle as an independently packaged device. However, those skilled in the art may realize that the power supply unit 251 and the control module 221 that are electrically connected may also be installed in different positions of the vehicle in a non-independent package manner. The packaging manner and installation position of the power supply unit 251 and the control module 221 may be adjusted according to the actual layout of the vehicle, as long as power may be supplied to the electric brake devices 231-232 at both ends of the axle 241.

In one embodiment, the operation demand may be a brake demand input by a driver through a brake pedal 261. The power supply unit 251 of the control module 221 may be configured with redundancy, comprising two redundant sub-power supply units 2511-2512. The two sub-power supply units 2511-2512 and the power supply unit 252 may be a module composed of an ultra-capacitor unit, for example, a graphene-based ultra-capacitor unit, whose output voltage may be 48 V.

The ultra-capacitor is a capacitive power source, which mainly relies on electric double layer capacitors and redox quasi-capacitance charges to store electric energy, Reliable high power output may be achieved in a short time by employing ultra-capacitors as direct power supplies of the electric brake devices 231-234.

Specifically, in response to receiving the braking demand described above, the sub-power supply unit 2511 of the power supply unit 251 may supply power to the electric brake device 231 of a right wheel 271 of the axle 241. The sub-power supply unit 2512 of the power supply unit 251 may supply power to the electric brake device 232 of a left wheel 272 of the axle 241. The power supply unit 252 may supply power to the electric brake devices 233-234 of left and right wheels 273-274 of the axle 242 at the same time. The electric brake devices 231-234 provided on the wheels 271-274 of the vehicle may use energy provided by the power supply in units 251-252 to control the brake motor to rotate, thereby driving a mechanical transmission mechanism to push brake pads towards or away from brake discs to generate a required braking force. It may be understood that power supply unit 252 corresponding to the control module 222 of the axle 242 may also be configured with redundancy.

By configuring the power supply unit 251 and/or 252 as a redundant power supply structure comprising two redundant sub-power supply units, the problem of braking performance reduction of the vehicle due to power loss of any of the sub-power supply units may be solved. The above power loss problems comprise, but are not limited to, excessively low voltage and insufficient energy storage of ultra-capacitors, which may be caused by control module failure, charging module failure, ultra-capacitor leakage, disconnection of power connection lines, and other reasons.

Specifically, when a power loss occurs in the sub-power supply unit 2511 of the power supply unit 251, the sub-power supply unit 2512 of the power supply unit 251 may still supply power to the electric brake device 232 of the left wheel 272 of the axle 241, thereby ensuring that the electric brake device 232 of the left wheel 272 of the axle 241 may obtain energy to generate sufficient braking force. Conversely, when a power loss occurs in the sub-power supply unit 2512 of the power supply unit 251, the sub-power supply unit 2511 of the power supply unit 251 may still supply power to the electric brake device 231 of the right wheel 271 of the axle 241, thereby ensuring that the electric brake device 231 of the right wheel 271 of the main load-bearing axle 241 may obtain energy to generate sufficient braking force. When a power loss occurs in the power supply unit 252, the two sub-power supply units 251-212 of the power supply unit 251 may still supply power to the electric brake devices 231-232 of the left and right wheels 271-227 of the axle 241, thereby ensuring that the electric brake devices 231-232 of the left and right wheels 271-227 of the axle 241 may obtain energy to generate sufficient braking force.

In one embodiment, the axle 241 may be the front axle of a vehicle. When the vehicle is a front-drive vehicle or a tractor, the weight of the vehicle is mainly carried by the front axle. Therefore, regardless of the load condition of the vehicle, the front axle with the power supply unit 251 with redundancy always at least carries the main body weight of the vehicle, thereby ensuring that the wheels 271-272 at both ends may always generate a certain amount of friction.

In another embodiment, the power supply unit 252 corresponding to the control module 222 of the axle 242 is also configured with redundancy, so that braking performance of the brake system can be guaranteed regardless of the weight distribution, the load condition and the load distribution of the vehicle.

Those skilled in the art may understand that the braking demand is an embodiment of the operation demand in the present invention, mainly used to clearly show the concept of the present invention and provide a specific solution that is convenient for the public to implement, but not to limit the protection scope of the present invention.

Optionally, in other embodiments, the operation demand may further comprise a demand for requesting the electric brake devices 231-234 to perform other operations. The other operations comprise, but are not limited to, operations such as waking the electric brake devices 231-234, self-checking the electric brake devices 231-234, calibrating the electric brake devices 231-234, and driving the electric brake device 231-234 into a standby position. In response to the demand for the electric brake devices 231-234 to perform the other operations described above, the electric brake devices 231-234 provided at the ends of each of the axles 241-242 of the vehicle may use the energy provided by the power supply units 251-252 of the corresponding control modules 221-222 to perform corresponding operations.

Those skilled in the art may also understand that the proposal of using a capacitive power source such as the high-voltage (48 V) ultra-capacitor to supply power to the electric brake devices 231-234 is only a preferred embodiment of the present invention, which is mainly used to improve the braking force output of the electric brake devices 231-234.

Optionally, in another embodiment, the axle 242 may also be powered by a low-voltage (24 V) battery. That is, the power supply unit 252 of the control module 222 corresponding to the rear axle 242 of the vehicle may be a battery. The battery may be charged by the charging battery 21 of the vehicle.

In one embodiment of the present invention, the control module 221 of the electromechanical brake system may comprise energy management units 31-32 corresponding to the power supply unit 251. The energy management units 31-32 may be configured to manage the charging and discharging of the power supply unit 251.

Figure 3A:
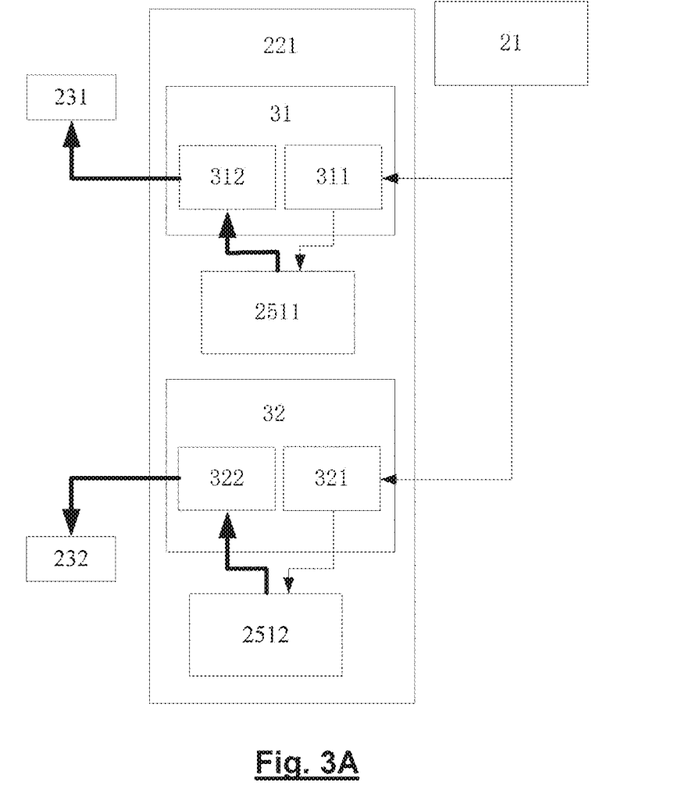
FIG. 3A shows a schematic structural diagram of a control module according to an embodiment of the present invention.

Referring to FIG. 3A, FIG. 3A shows a schematic structural diagram of a control module according to an embodiment of the present invention.

As shown in FIG. 3A, the control module 221 may comprise energy management units 31-32. The energy management unit 31 corresponds to the sub-power supply unit 2511 of the power supply unit 251 and may be configured to manage the charging and discharging of the sub-power supply unit 2511. The energy management unit 32 corresponds to the sub-power supply unit 2512 of the power supply unit 251 and may be configured to manage the charging and discharging of the sub-power supply unit 2512.

The energy management unit 31 may comprise a charge controller 311 and a power supply switch 312. The charge controller 311 is electrically connected to the recharging power source 21 of the vehicle and the corresponding sub-power supply unit 2511, configured to control the recharging power source 21 to charge the sub-power supply unit 2511 according to the energy level of the sub-power supply unit 2511. The power supply switch 312 is electrically connected to the electric brake device 231 of the right wheel 271 of the front axle 241 of the vehicle and the sub-power supply unit 2511, configured to control the sub-power supply unit 2511 to supply power to the corresponding electric brake device 231 in response to an operation demand.

Accordingly, the energy management unit 32 may comprise a charge controller 321 and a power supply switch 322. The charge controller 321 is electrically connected to the charging power supply 21 of the vehicle and the corresponding sub-power supply unit 2512, configured to control the charging power supply 21 to charge the sub-power supply unit 2512 according to the energy level of the sub-power supply unit 2512. The power supply switch 322 is electrically connected to the electric brake device 232 of the left wheel 272 of the front axle 241 of the vehicle and the sub-power supply unit 2512, configured to control the sub-power supply unit 2512 to supply power to the corresponding electric brake device 232 in response to an operation demand.

Specifically, the charge controllers 311-321 of the energy management units 31-32 may monitor the voltage values of the corresponding sub-power supply units 2511-2512 in real time, thereby monitoring the energy level of the power supply unit 251. In response to the voltage value of any one of the sub-power supply units 2511-2512 being lower than a preset voltage threshold, the corresponding charge controller 311-321 may control the recharging power source 21 of the vehicle to charge the low-power sub-power supply unit 2511-2512, thereby timely replenishing the energy consumed in a vehicle brake.

By providing the charge controllers 311-321, the electromechanical brake system may individually control the recharging power source 21 to charge each of the sub-power supply units 2511-2512 according to the current energy level of each of the sub-power supply units 2511-2512. Therefore, the charge controller 311-321 may reduce the repeated charging of the sub-power supply units 2511-2512 as much as possible under the premise of ensuring normal power supply of the sub-power supply units 2511-2512, thereby extending the life of the sub-power supply units 2511-2512.

Optionally, in one embodiment, the power supply switches 312-322 of the energy management units 31-32 may maintain a standby state. In response to receiving the operation demands mentioned above, the power supply switches 312-322 may control the corresponding sub-power supply units 2511-2512 to supply power to the corresponding electric brake devices 231-232, so that the corresponding electric brake devices 231-232 may obtain sufficient energy to perform corresponding operations.

By providing the power supply switches 312-322, the electromechanical brake system may individually control each of the sub-power supply units 2511-2512 to supply power to the corresponding electric brake device 231-232 according to the received operation demands, so that the corresponding electric brake device 231-232 may obtain sufficient energy to perform corresponding operations.

Those skilled in the art may understand that the proposal of configuring the energy management units 31-32 for the control module 221 with the redundant power supply unit 251 is only one embodiment of the present invention, mainly used to clearly show the concept of the present invention and provide a specific solution that is convenient for the public to implement, but not to limit the scope of protection of the present invention.

Figure 3B:
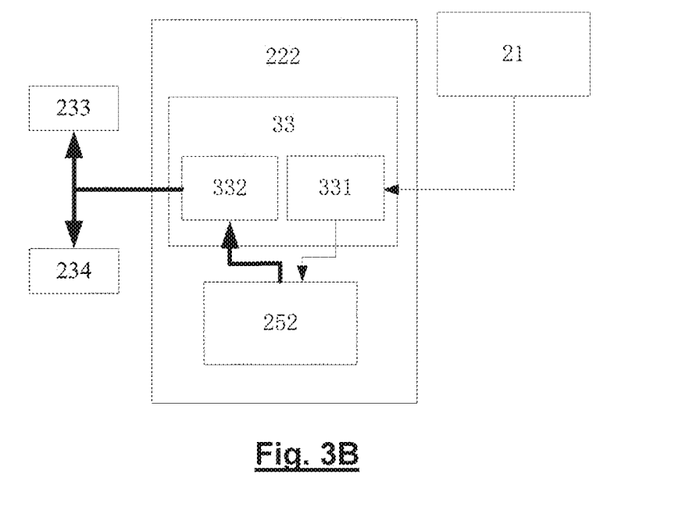
FIG. 3B shows a schematic structural diagram of a control module according to another embodiment of the present invention.

Referring to FIG. 3B, FIG. 3B shows a schematic structural diagram of a control module according to another embodiment of the present invention.

As shown in FIG. 3B, in another embodiment, the control module 222 of the electromechanical brake system may also comprise an energy management unit 33. The energy management unit 33 corresponds to the power supply unit 252, and may be configured to manage the charging and discharging of the power supply unit 252.

Specifically, the energy management unit 33 may comprise a charge controller 331 and a power supply switch 332. The charge controller 331 is electrically connected to the recharging power source 21 of the vehicle and the corresponding power supply unit 252, configured to control the recharging power source 21 to charge the power supply unit 252 according to the energy level of the power supply unit 252. The power supply switch 332 electrically connects the two electric braking devices 233-234 of the left and right wheels 273-274 of the rear axle 242 of in the vehicle and the power supply unit 252, configured to control the power supply unit 252 to supply power to the two corresponding electric brake devices 233-234 in response to the operation demands.

The charge controller 331 of the energy management unit 33 may monitor the voltage value of the corresponding power supply module 252 in real time, thereby monitoring the energy level of the power supply unit 252. The power supply switch 332 of the energy management unit 33 may maintain a standby state. In response to the voltage value of the power supply module 252 being lower than a preset voltage threshold, the corresponding charge controller 331 may control the recharging power source 21 of the vehicle to charge the low-power power supply unit 252. In response to receiving the operation demands, the power supply switch 332 may control the corresponding power supply unit 252 to supply power to the two corresponding electric brake devices 233-234, so that the two corresponding electric brake devices 233-234 may obtain sufficient energy to perform corresponding operations.

Those skilled in the art may understand that the electromechanical brake system comprising two control modules 221-222 is only one embodiment of the present invention, mainly used to clearly show the concept of the present invention and provide a specific solution that is convenient for the public to implement, but not to limit the protection scope of the present invention.

Figure 4:
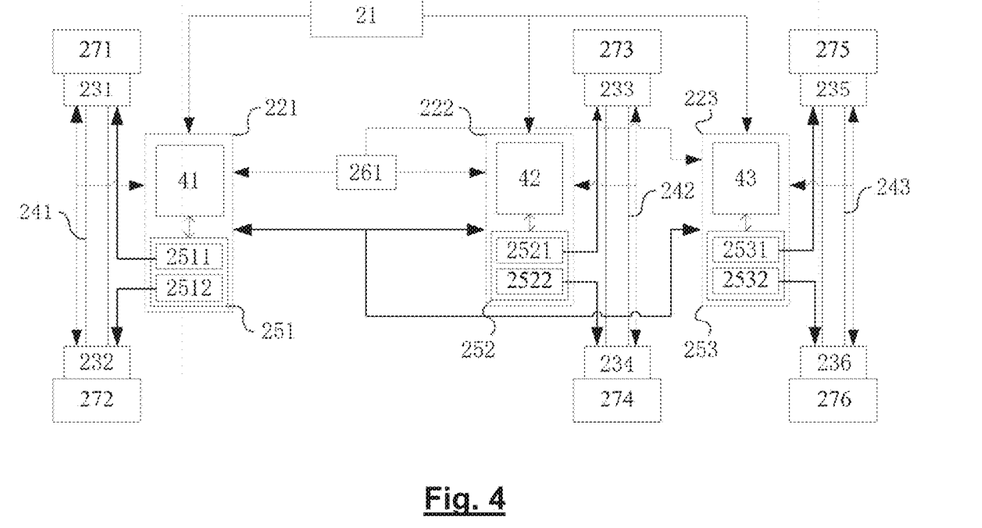
FIG. 4 shows a schematic structural diagram an electromechanical brake system according to an embodiment of the present invention.

Referring to FIG. 4, FIG. 4 shows a schematic structural diagram of an electromechanical brake system according to an embodiment of the present invention.

As shown in FIG. 4, in one embodiment of the present invention, the vehicle may comprise three axles 241-243. Each axle 241-243 may have wheels 271-276 at both ends. Each wheel 271-276 may be equipped with a corresponding electric brake device 231-236. Each electric brake device 231-236 may comprise a brake motor for generating a braking force, and a mechanical transmission mechanism driven by the brake motor. The electric brake devices 231-236 may be configured to perform corresponding operations according to the received operation demands.

Correspondingly, the electromechanical brake system provided according to this embodiment may comprise a recharging power source 21 and three control modules 221-223 corresponding to the axles 241-243. The control module 221 may comprise a power supply unit 251 that supplies power to the electric brake devices 231-232 provided at both ends of the corresponding axle 241 in response to an operation demand. The control module 222 may comprise a power supply unit 252 that supplies power to the electric brake devices 233-234 provided at both ends of the corresponding axle 242 in response to an operation demand. The control module 223 may comprise a power supply unit 253 that supplies power to the electric brake devices 235-236 provided at both ends of the corresponding axle 243 in response to an operation demand. The power supply units 251-253 comprise, but are not limited to, a capacitive power source and a battery, which are charged by the recharging power source 21 of the vehicle. The recharging power source 21 comprises, but is not limited to, a vehicle battery, a power battery, a vehicle generator, and a wheel hub generator. The output voltage of recharging power source 21 may be 12 V or 24 V.

In one embodiment, the operation demand may be a braking demand input by a driver through a brake pedal 261. The power supply units 251-253 of the control modules 221-223 may all be configured with redundancy, comprising two redundant sub-power supply units 2511-2512, 2521-

2522, and 2531-2532, respectively. The sub-power supply units 2511-2512, 2521-2522, and 2531-2532 may all be modules composed of ultra-capacitor units, such as graphene-based ultra-capacitor units, whose output voltage may be 48 V.

Specifically, in response to receiving the braking demand described above, the sub-power supply unit 2511 of the power supply unit 251 may supply power to the electric brake device 231 of the right wheel 271 of the axle 241. The sub-power supply unit 2512 of the power supply unit 251 may supply power to the electric brake device 232 of the left wheel 272 of the axle 241. The sub-power supply unit 2521 of the power supply unit 252 may supply power to the electric brake device 233 of the right wheel 273 of the axle 242. The sub-power supply unit 2522 of the power supply unit 252 may supply power to the electric brake device 234 of the left wheel 274 of the axle 242. The sub-power supply unit 2531 of the power supply unit 253 may supply power to the electric brake device 235 of the right wheel 275 of the axle 243. The sub-power supply unit 2532 of the power supply unit 253 may supply power to the electric brake device 236 of the left wheel 276 of the axle 243. The electric brake devices 231-236 provided on the wheels 271-276 of the vehicle may use the energy provided by the power supply units 251-253 to control the brake motor to rotate, thereby driving the mechanical transmission mechanism to push the brake pads towards or away from the brake disc to generate required braking force.

By configuring the power supply units 251-253 of all axles 241-443 of the vehicle as being redundant power supply structures, comprising two redundant sub-power supply units each, every electric brake device may have redundant power supply, so that braking performance of the brake system can be guaranteed regardless of the weight distribution, the load condition and the load distribution of the vehicle.

Specifically, when a power loss occurs in the sub-power supply unit 2511 of the power supply unit 251, the sub-power supply unit 2512 of the power supply unit 251 may still supply power to the electric brake device 232 of the left wheel 272 of the axle 241, thereby ensuring that the electric brake device 232 of the left wheel 272 of the front axle 241 may obtain energy to generate sufficient braking force. Conversely, when a power loss occurs in the sub-power supply unit 2512 of the power supply unit 251, the sub-power supply unit 2511 of the power supply unit 251 may still supply power to the electric brake device 231 of the right wheel 271 of the axle 241, thereby ensuring that the electric brake device 231 of the right wheel 271 of the front axle 241 may obtain energy to generate sufficient braking force. In the same way, the cases of the power supply units 252 and 253 with same configuration are not repeated here again.

Optionally, in one embodiment of the present invention, the control modules 221-223 of the electromechanical brake system may comprise energy management units 41-43 corresponding to the power supply units 251-253, respectively. The energy management units 41-43 may be configured to manage the charging and discharging of the power supply units 251-253.

As shown in FIG. 4, the energy management unit 41 may correspond to two sub-power supply units 2511-2512 of the power supply unit 251 and may be configured to manage the charging and discharging of the sub-power supply units 2511-2512. Specifically, the energy management unit 41 may comprise charge controllers and power supply switches. The charge controllers are electrically connected to the charging power supply 21 of the vehicle and the two corresponding sub-power supply units 2511-2512, configured to control the charging power supply 21 to charge the sub-power supply units 2511-2512 respectively according to the energy levels of the sub-power supply units 2511-2512. The power supply switches are electrically connected to the electric brake device 231 of the right wheel 271 of the front axle 241 of the vehicle and the sub-power supply unit 2511, and electrically connected to the electric brake device 232 of the left wheel 272 of the front axle 241 of the vehicle and the sub-power supply unit 2512, respectively. In response to the operation demands, the sub-power supply units 2511-2512 are controlled to supply power to the corresponding electric brake devices 231-232, respectively. The energy management units 42 and 43 may also adopt the configuration described above, and the details are not described herein again.

The charge controllers of the energy management units 41-43 may monitor the voltage values of the corresponding power supply units 251-253 in real time, thereby monitoring the energy levels of the power supply units 251-253. The power switches of the energy management units 41-43 may maintain a standby state. In response to the voltage value of any of the power supply units 251-253 being lower than a preset voltage threshold, the corresponding charge controller may control the recharging power source 21 of the vehicle to charge the low-power power supply unit, thereby replenishing the energy consumed in a vehicle brake in time. In response to receiving the operation demands, the power supply switches may control the corresponding power supply units 251-253 to supply power to the two corresponding electric brake devices 231-236, so that the corresponding electric brake devices 231-236 may obtain sufficient energy to perform corresponding operations.

By providing the energy management units 41-43, the electromechanical brake system may control the charging power supply 21 to charge the power supply units 251-253 according to the current energy level of the power supply units 251-253, and control the power supply units 251-253 to supply power to the corresponding electric brake devices 231-233, so that the corresponding electric brake devices 231-233 may obtain sufficient energy to perform corresponding operations.

Optionally, in one embodiment of the present invention, the three control modules 221-223 of the electromechanical brake system shown in FIG. 4 may be electrically connected. The power supply units 251-253 of the three control modules 221-223 are mutually redundant.

When all three control modules 221-223 are working normally, in response to receiving operation demands, the control modules 221-223 may supply power to the electric brake devices 231-236 at the ends of the corresponding axles 241-243 through its power supply units 251-253, so that the corresponding electric brake devices 231-236 may obtain sufficient energy to perform corresponding operations.

When any one of the three control modules 221-223 fails, taking the control module 221 as an example, the power supply unit 251 of the faulty control module 221 may not be able to supply power to the electric brake devices 231-232 at both ends of the corresponding axle 241. At this time, the two control modules 222-223 that are communicatively connected to the faulty control module 221 may judge the working status of their power supply units 252-253. In response to the control module 222 being able to work normally, the control module 222 may supply power to the electric brake devices 231-232 at both ends of the axle 241 by the power supply unit 252, so that the electric brake devices 231-232 may obtain sufficient energy to perform corresponding operations.

That is, by electrically connecting the three control modules 221-223, the power supply unit 251-253 of each of the three control modules 221-223 may serve as a redundant power source for the remaining two. Once any control module fails to supply power to its corresponding electric brake device due to a failure, the remaining control modules that work normally may use their own power supply units as backup power supplies to supply power to the faulty control module or supply power directly to the electric brake device of the axle corresponding to the faulty control module via the internal circuit of the faulty control module, thereby further improving the reliability of the electromechanical brake system.

Those skilled in the art may understand that the proposal of respectively supplying power from two sub-power supply units to an electric brake device provided at each end of the axle is only an embodiment of the present invention, mainly used to clearly show the concept of the present invention and provide a specific solution that is convenient for the public to implement, but not to limit the protection scope of the present invention.

Figure 5:
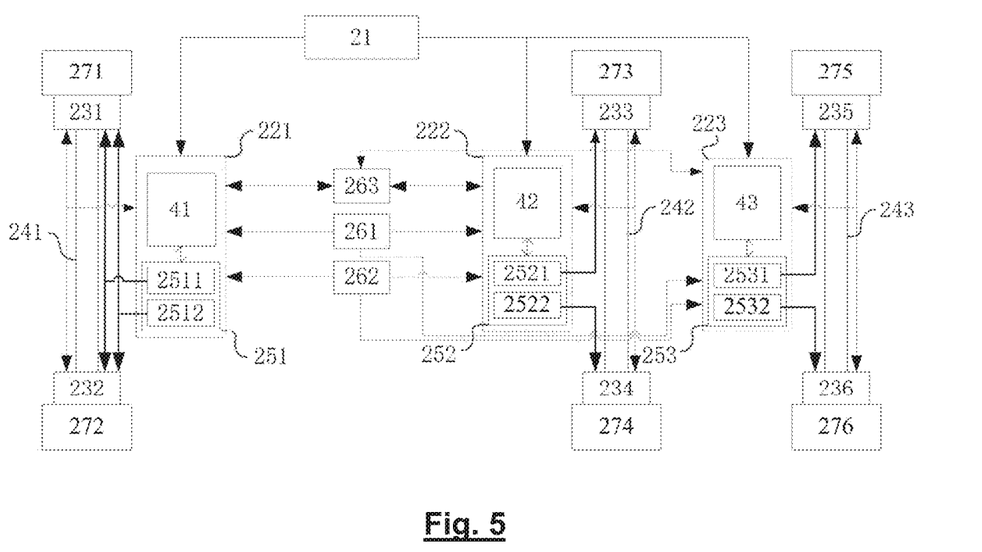
FIG. 5 shows a schematic structural diagram of an electromechanical brake system according to an embodiment of the present invention.

Referring to FIG. 5, FIG. 5 shows a schematic structural diagram of an electromechanical brake system according to an embodiment of the present invention.

Different from the embodiment shown in FIG. 4, each of the sub-power supply units 2511-2512 of the power supply unit 251 electrically connects the electric brake devices 231-232 disposed at both ends of the axle 241.

An exemplary configuration of redundancy is that the sub-power supply units 2511-2512 of the power supply unit 251 redundantly supply power to each electric brake device 231-232. Specifically, in normal working condition, the electric brake device 231 is powered by sub-power supply unit 2511 and the electric brake device 232 is powered by sub-power supply unit 2512. When any of the sub-power supply unit 2511-2512 is in a fault condition, the other sub-power supply unit is switched to simultaneously supply power to the electric brake devices 231-232. For securing brake performance, two high voltage sub-power supply units 2511-2512 e.g. 48 V, may be used in this configuration.

Figure 6:
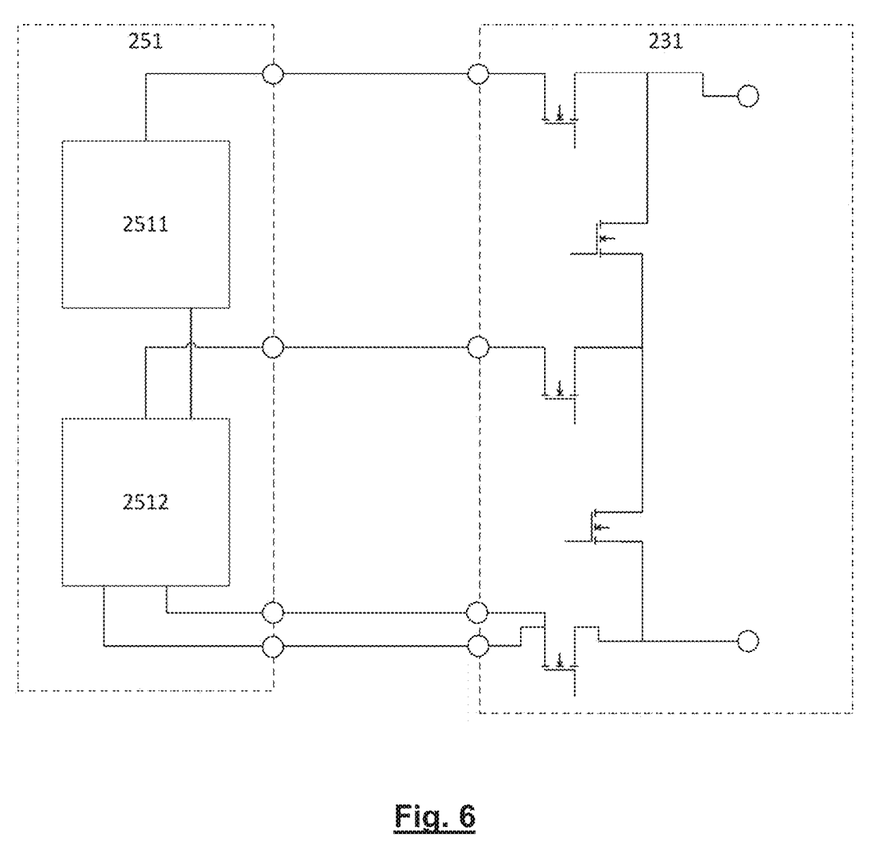
FIG. 6 shows a schematic structural diagram of a power supply unit with redundancy according to an embodiment of the present invention.

Another exemplary configuration of redundancy is that each of the sub-power supply units 2511-2512 simultaneously supplies power to both electric brake devices 231-232. Referring to FIG. 6, which shows a schematic structural diagram of a power supply unit with redundancy. For concise description, part of redundant circuit and electric brake device 232 are omitted. Specifically, taking the power supply unit 251 redundantly supplying power to the electric brake device 231 as example, in normal working condition, sub-power supply units 2511-2512 simultaneously supply power to the electric brake device 231, when the sub-power supply unit 2511 is in a fault condition, the sub-power supply unit 2512 utilizes the redundant current path to supply power to the electric brake device 231 solely, vice versa.

Figure 7:
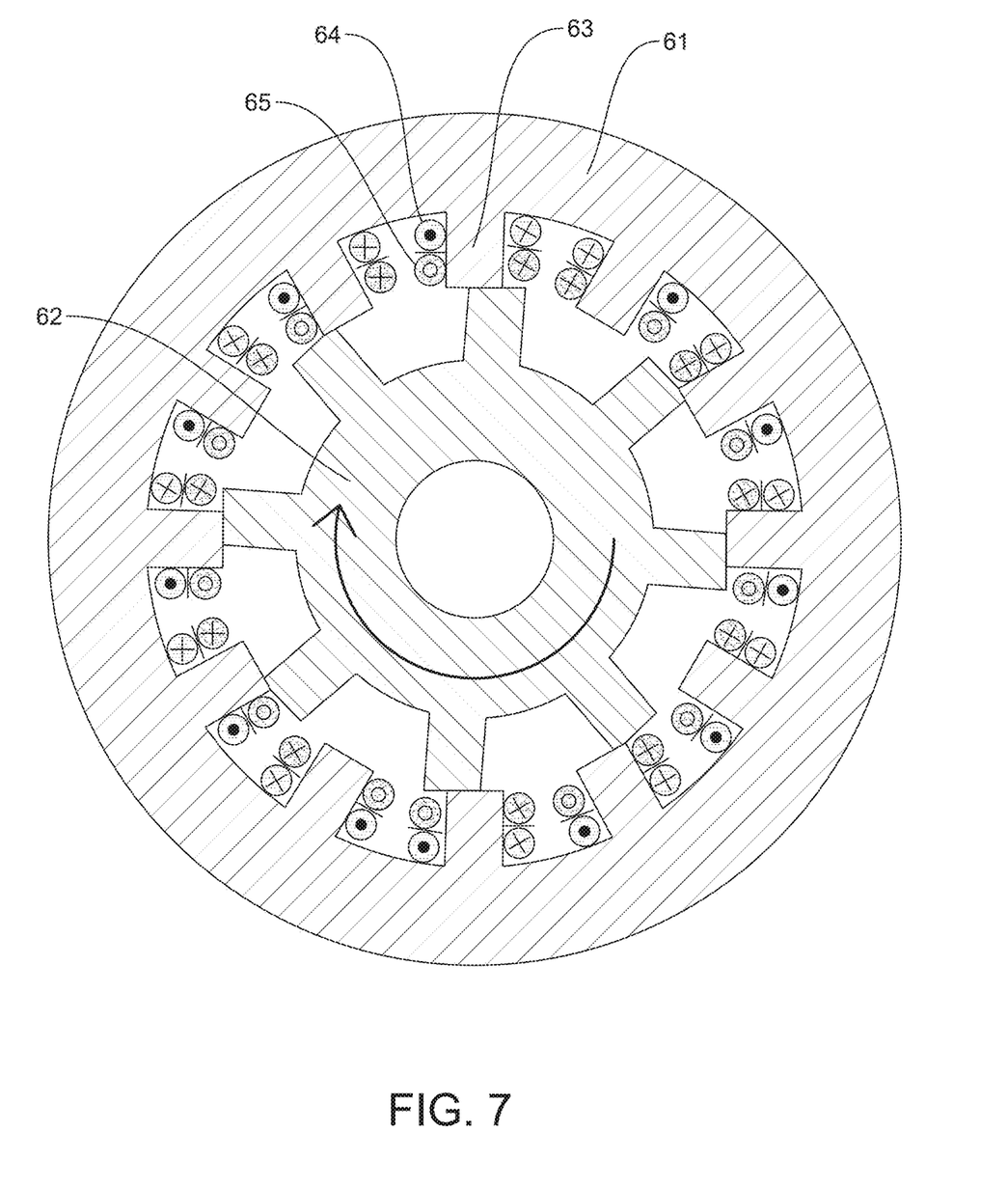
FIG. 7 shows a schematic structural diagram of a brake motor according to an embodiment of the present invention.

An exemplary configuration of redundancy is that each of the sub-power supply units 2511-2512 electrically connects the electric brake devices 231-232 disposed at both ends of the axle 241, wherein each of the brake motors of the electric brake devices 231-232 has two sets of windings as shown in FIG. 7. As shown in FIG. 7, the brake motor may comprise a stator 61 and a rotor 62. The stator 61 may comprise cores 63 uniformly distributed in a circumferential direction. Two sets of electrically insulated windings 64-65 for generating a rotating magnetic field are wound on the core 63, wherein the winding 64 is powered by one sub-power supply unit, and the winding 65 is powered by another sub-power supply unit. The rotor 62 may be made of a permanent magnet comprising magnetic cores uniformly distributed in a circumferential direction. The rotor 62 may rotate in response to the rotating magnetic field generated by the windings 64-65.

By providing two sets of independent electrically insulated windings 64-65 on the stator 61, the brake motor may have multiple options for driving the rotor 62. When the sub-power supply unit 2511 supplies power to the winding 64, the two electric brake devices 231-232 at the wheel ends of the front axle 241 of the vehicle may control the rotors 62 of the corresponding brake motors to rotate under the driving of the winding 64. When the sub-power supply unit 2512 supplies power to the winding 65, the two electric braking devices 231-232 at the wheel ends of the front axle 241 of the vehicle may control the rotors 62 of the corresponding brake motors to rotate under the driving of the winding 65. Another feasible driving method is that the sub-power supply units 2511 and 2512 may supply power to the windings 64 and 65 at the same time. In other words, in the case that the two sub-power supply units 2511-2512 may both work normally, the two sets of electrically insulated windings 64-65 may simultaneously provide driving torque for the brake motor rotors 62 of the two electric brake devices 231-232 to generate braking force.

When a power loss occurs in the sub-power supply unit 2511, the sub-power supply unit 2512 may generate magnetic force in the same magnetic circuit of the brake motors by the winding 65, providing driving torque for the brake motor rotors 62 of the electric brake devices 231-232 to generate braking force.

Correspondingly, when a power loss occurs in the sub-power supply unit 2512, the sub-power supply unit 2511 may generate magnetic force in the same magnetic circuit of the brake motors by the winding 64, providing driving torque for the brake motor rotors 62 of the electric brake devices 231-232 to generate braking force.

Those skilled in the art may understand that the dual-winding 64-65 construction brake motor described above is only an embodiment of the present invention, mainly used to clearly show the concept of the present invention and provide a specific solution that is convenient for the public to implement, but not to limit the protection scope of the present invention.

As exemplarily shown in FIG. 5, the configuration of the power supply unit 251 redundantly supplies power to electric brake devices 231-232, yet the power supply units 252-253 adopt a different redundant power supply configuration with power supply unit 251 to supply power to electric brake devices 233-236. Those skilled in the art may understand that the power supply units 252-253 may adopt the same redundant configuration as power supply unit 251 to supply power to the corresponding electric brake devices 233-236, and the details are not described herein again.

In another embodiment, based on the concept of the present invention, the drive modules of the brake motors of the electric brake devices 231-232 may also be provided redundantly. The two redundant drive modules may be electrically connected to a sub-power supply unit 2511-2512 respectively, thereby powered by a corresponding sub-power supply unit 2511-2512. Alternatively, redundant drive modules may be configured to correspond to the dual windings 64-65 of the brake motor to provide a completely redundant brake motor drive circuit.

Specifically, when the two sub-power supply units 2511-2512 may both work normally, the two sets of drive modules may simultaneously provide driving torque for the brake motor rotors 62 of the two electric brake devices 231-232 to generate braking force. When a power loss occurs in the sub-power supply unit 2511, the sub-power supply unit 2512 may provide a driving torque to the brake motor rotors 62 of the electric braking devices 231-232 by a corresponding drive module to generate a braking force. When a power loss occurs in the sub-power supply unit 2512, the sub-power supply unit 2511 may provide a driving torque to the brake motor rotors 62 of the electric brake device 231-232 by a corresponding drive module to generate a braking force.

In other embodiments, based on the concept of the present invention, the brake motors of the electric brake devices 231-232 may also comprise a corresponding number of windings and/or drive modules, corresponding to that the power supply unit 251 comprise three or more sub-power supply units. Each set of windings and/or drive module may be electrically connected to a sub-power supply unit, so as to be powered by a corresponding sub-power supply unit.

Optionally, in one embodiment of the present invention, the electric brake devices may further comprise an electromagnetically operated braking force holding device. The electromagnetically operated braking force holding device comprises, but is not limited to, an electromagnetic brake, a permanent magnetic brake, and a solenoid, and may be configured to maintain the braking force output by the electric brake device. For example, by using a power-off type permanent magnetic brake, the transmission mechanism of the electric brake device may be locked in the absence of power, thereby achieving energy-saving braking force retention, such as a parking function. Each braking force holding device may comprise two sets of windings. Similar to the brake motor described above, a configuration in which power is supplied by different sub-power supply units is adopted to ensure that the braking force holding device has redundant power supply.

In the embodiments of the present invention, the brake pedal 261 is only an exemplary embodiment for generating an operation demand or a braking demand. A parking switch, a non-human operating system or module may also be used as sources of the operation demand or the braking demand. As shown in FIG. 5, in addition to the brake pedal 261, the parking switch 262 and the non-human operating system or module 263 are also communicatively connected to the control modules 221-223. The non-human operating system or module 263 comprises, but is not limited to, one or more of an antilock brake system (ABS), an acceleration slip regulation (ASR) system, an autonomous emergency braking (AEB) system, and an unmanned driving system of a vehicle, and may automatically generate a corresponding operation demand or a braking demand according to the control instructions of the control module 221-223 or other controllers of the vehicle.

The previous description of the disclosure is provided to enable any person skilled in the in art to make or use the disclosure. Various modifications to the present disclosure will be obvious to those skilled in the art, and the general principles defined herein may be applied to other variations without departing from the spirit or scope of the disclosure. Thus, the present disclosure is not intended to be limited to the examples and designs described herein, but is to be accorded the broadest scope of the principles and novel features disclosed herein.

Many variations and modifications may be made to the preferred embodiments of the invention without departing substantially from the spirit and principles of the invention. All such modifications and variations are intended to be included herein within the scope of the present invention, as defined by the following claims.

We claim:

1. An electromechanical brake system, comprising:
a recharging power source; and
at least two control modules corresponding to axles of a vehicle;
wherein each control module comprises a power supply unit that supplies power to electric brake devices disposed at opposite ends of a corresponding axle in response to an operation demand, and the power supply unit is charged by the recharging power source;
wherein the power supply unit of at least one of the control modules is configured with redundancy;
wherein the power supply unit with redundancy comprises at least two sub-power supply units; and
wherein each sub-power supply unit electrically connects the electric brake device disposed at one end of the corresponding axle and supplies power thereto.

2. The electromechanical brake system of claim 1, wherein each control module further comprises an energy management unit corresponding to the power supply unit, and wherein the energy management unit is configured to manage charging and discharging of the corresponding power supply unit.

3. The electromechanical brake system of claim 2, wherein the energy management unit further comprises a charge controller, electrically connected to the recharging power source and the corresponding power supply unit, and wherein the charge controller controls the recharging power source to charge the corresponding power supply unit depending on an energy level of the corresponding power supply unit.

4. The electromechanical brake system of claim 2, wherein the energy management unit further comprises a power supply switch, electrically connected to a corresponding electric brake device and the corresponding power supply unit, and wherein the power supply switch controls the corresponding power supply unit to supply power to the corresponding electric brake device in response to the operation demand.

5. The electromechanical brake system of claim 1, further comprising:
an electromagnetically operated braking force holding device comprising at least two sets of windings and/or drive modules, wherein each of the sub-power supply units supplies power to one set of the windings and/or the drive modules.

6. The electromechanical brake system of claim 5, wherein the braking force holding device further comprises an electromagnetic brake and/or a solenoid.

7. The electromechanical brake system of claim 1, wherein each of the sub-power supply units electrically connects the electric brake devices disposed at both ends of the corresponding axle; and
wherein said two sub-power supply units redundantly supply power to each electric brake device disposed at each end of the corresponding axle, or each of the sub-power supply units simultaneously supplies power to the electric brake devices disposed at both ends of the corresponding axle.

8. The electromechanical brake system of claim 1, further comprising:

a brake motor comprising at least two sets of windings and/or drive modules, wherein each of the sub-power supply units supplies power to one set of the windings and/or the drive modules.

9. The electromechanical brake system of claim 1, wherein the power supply unit of the control module corresponding to the axle loaded with the main body weight of the vehicle is configured with redundancy.

10. The electromechanical brake system of claim 1, wherein the power supply unit comprises a capacitive power source and/or a battery.

11. The electromechanical brake system of claim 1, wherein a plurality of the control modules are electrically connected to each other, and wherein the power supply units of the plurality of the control modules are redundant with each other.

* * * * *